United States Patent

[11] 3,613,921

[72] Inventors James W. Ryden
Phoenix;
John C. Abromavage, Tempe, both of Ariz.
[21] Appl. No. 853,127
[22] Filed Aug. 26, 1969
[45] Patented Oct. 19, 1971
[73] Assignee Arcoa, Incorporated
Phoenix, Ariz.

[54] TOW DOLLY FOR WHEELED VEHICLES
6 Claims, 7 Drawing Figs.
[52] U.S. Cl....................................................... 214/85,
214/334, 280/463, 280/443
[51] Int. Cl....................................................... B60p 1/44
[50] Field of Search............................................ 214/85,
505, 506, 334; 280/463, 468, 443, 86 A

[56] References Cited
UNITED STATES PATENTS
1,230,326 6/1917 Puderbaugh .................. 214/334
1,819,625 8/1931 Schroeder..................... 214/505
2,510,525 6/1950 Smart et al..................... 280/33.55
2,701,069 2/1955 Hawkins........................ 214/86 A
3,138,271 6/1964 De Lay et al................... 214/84 X
3,212,793 10/1965 Pietroroia...................... 280/443
3,361,277 1/1968 Johnson et al. ............... 214/334

Primary Examiner—Albert J. Makay
Attorney—David H. Semmes

ABSTRACT: A tow dolly for wheeled vehicles of the type embodying a chassis having a pair of arms converging as a trailer tongue at its forward end and supporting an axle and pair of wheels at its aft end. The chassis includes a pair of towed vehicle wheel ramps pivoted to act as a ramp for loading of the towed vehicle front wheels onto the chassis and configured to confine the front wheels during towing. The structure distinguishes from the prior art in combining these features with surge braking and linked steering mechanisms for turning the two dolly wheels as the towing vehicle turns, as well as a compression means damping the pivoting of the wheel ramp during loading and towing.

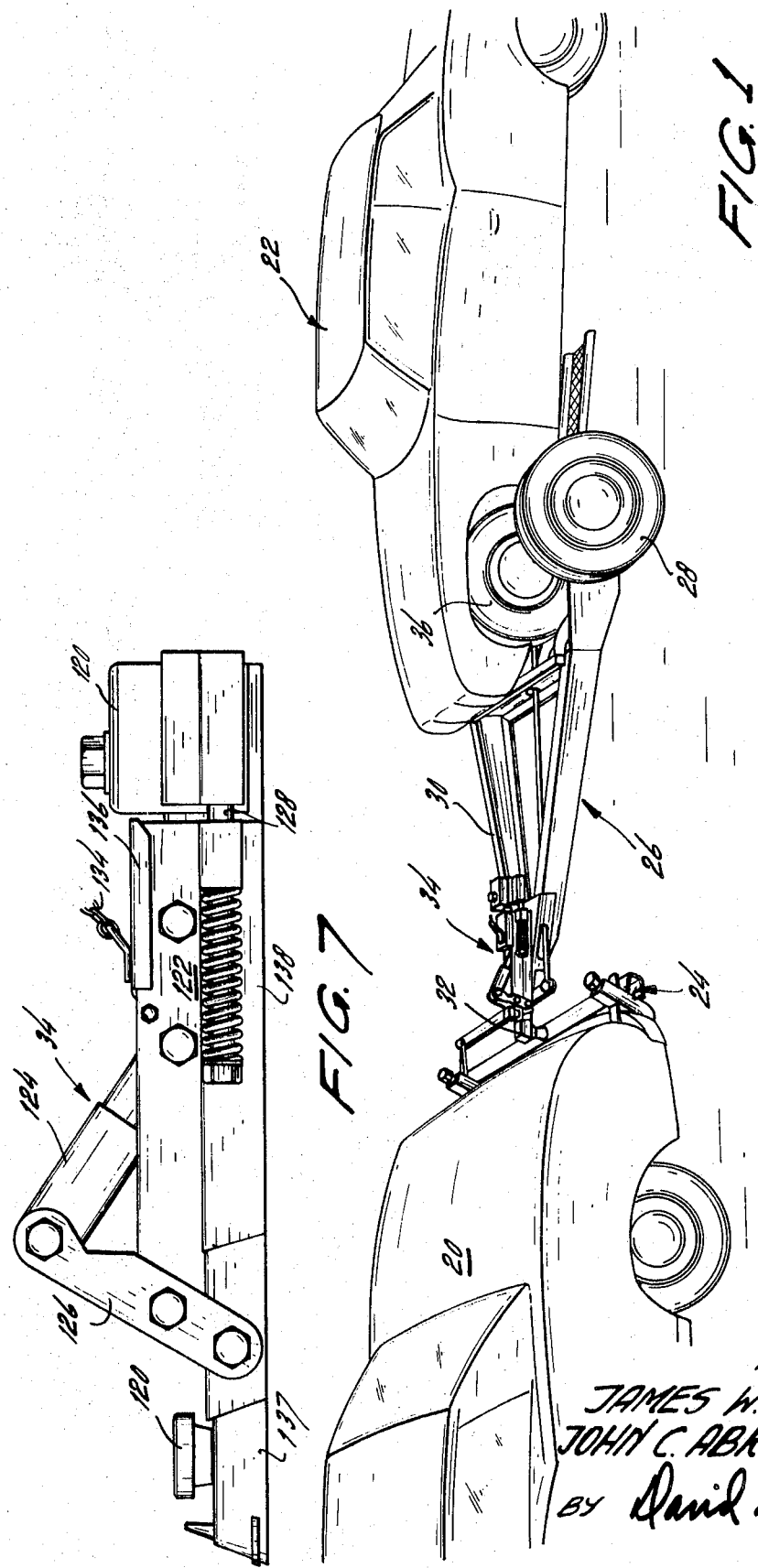

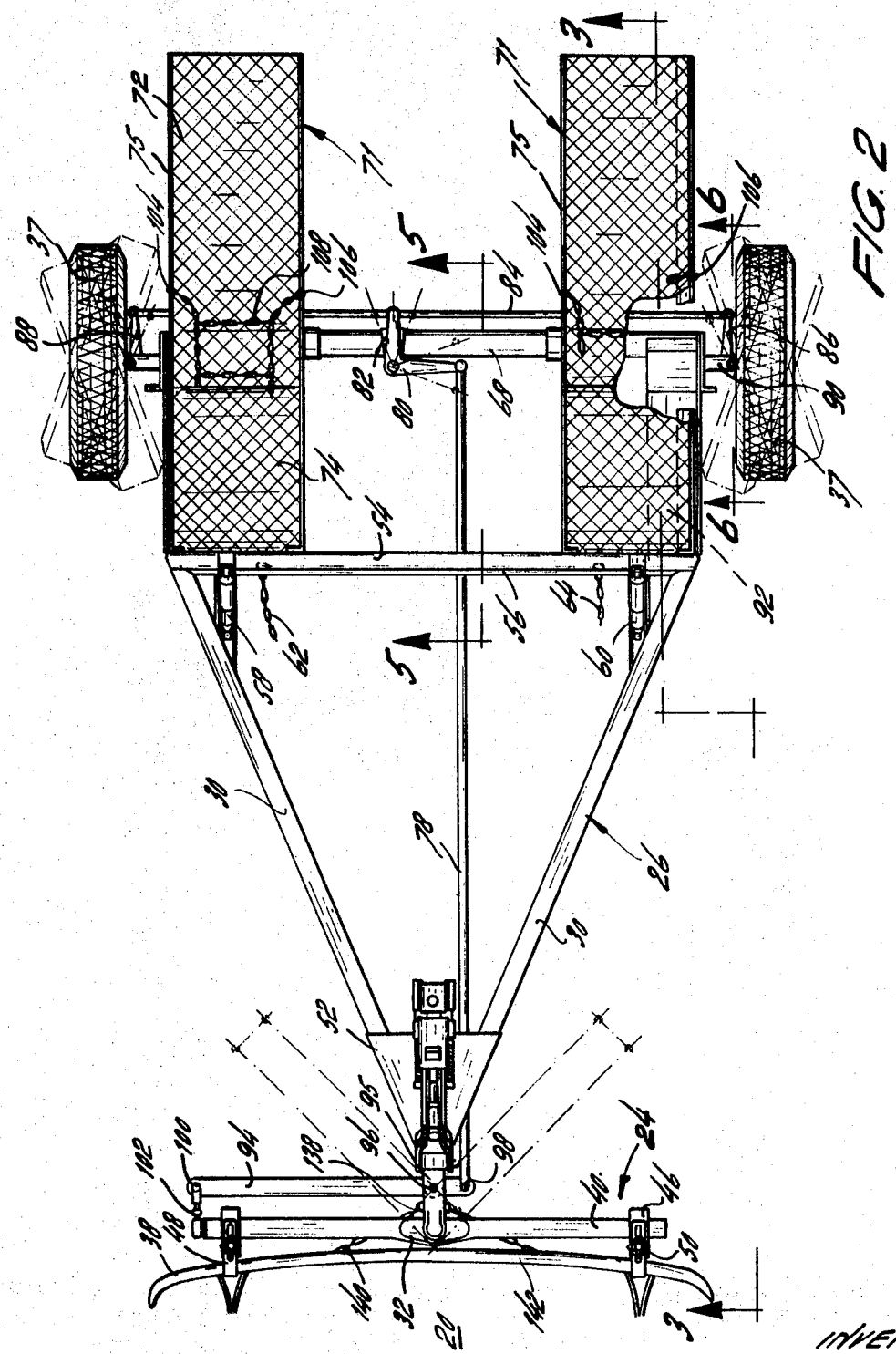

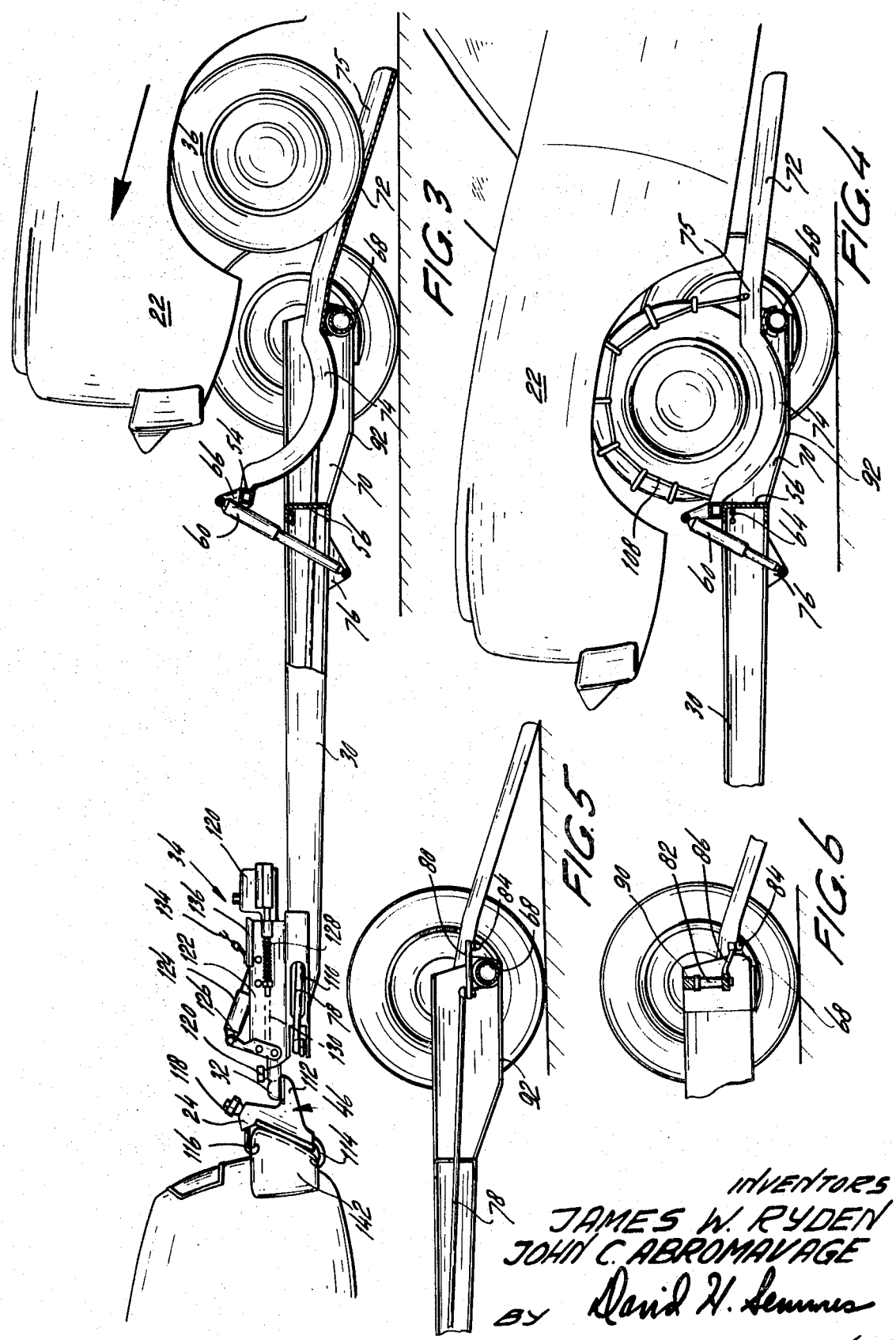

TOW DOLLY FOR WHEELED VEHICLES

BACKGROUND OF THE INVENTION

1. Field of the Invention

This invention concerns rescue towing of disabled vehicles or towing of vehicles which are required to be transported without a drive, particularly, a wheeled trailer or dolly which can be readily connected to a towing vehicle, towed to the vehicle to be moved, and readily loaded with this vehicle for towing to repair or service. The device eliminates the necessity for capital investment in the conventional wrecking or towing truck and can easily be handled by an inexperienced operator.

2. The Prior Art

Prior art searching has developed the following:

| | |
|---|---|
| Rodin | 2,210,007 |
| Hunt | 2,312,646 |
| Whitlow | 2,559,487 |
| Averette | 2,561,644 |
| Pankonin | 2,695,181 |
| Henry | 2,750,208 |
| Lorr | 2,797,106 |
| Isachsen | 2,974,978 |
| Mannheim | 3,061,020 |
| Bigge | 3,156,487 |
| Lemmon | 3,322,439 |

The prior art teaches the employment of trailers attachable to a towing vehicle automobile bumper or hitch bars. These trailers include a steering bar and like mechanisms for turning the trailer wheels upon the trailer.

However, the prior art does not suggest the combination of a wheeled tow dolly with surge brake and steering mechanisms, as well as shocks interconnecting the trailer chassis and the loading ramp.

Rodin, Hunt, Whitlow, and Averette are typical of steering mechanisms for trailers attachable to the bumper of the prime mover. Averette shows a trailer wheeled dolly with steering arm 56 connected to a bumper of the prime mover. Bigge and Lemmon are examples of steering bars used with semitrailers. Mannheim is typical of a dollylike mechanism used with a tractor harrow. Isachsen shows a rodlike steering mechanism involving a wheeled link and a main member cam plate (1).

SUMMARY OF THE INVENTION

According to the present invention, a tow dolly for wheeled vehicles is provided with a wheeled chassis having its front converging as a tongue connectable to a towing vehicle rear bumper and its aft end supporting an axle and a pair of wheels. A pair of towed vehicle wheel ramps are longitudinally pivoted in the aft end of the chassis, so as to serve as an inclined ramp for loading of the towed vehicle under its own power and a confining member for securing the towed vehicle front wheels, as the vehicle is towed. Compression means are interposed between the forward end of the wheel ramp and the chassis, so as to dampen the load. Also, locking chains are provided to lock the towed vehicle wheels to the wheel ramp, thus providing use of the towed vehicle's suspension system to dampen the load during towing.

BRIEF DESCRIPTION OF THE DRAWINGS

FIG. 1 is a fragmentary perspective view of a towing vehicle pulling a towed vehicle, having its front wheels secured upon the tow dolly chassis FIG. 2 is a top plan of the tow dolly prior to loading;

FIG. 3 is a longitudinal sectional view taken along section line 3—3 of FIG. 2, showing the loading of the towed vehicle upon the inclined wheel ramps, pivoted so as to touch the ground;

FIG. 4 is a similar view showing the towed vehicle in place with its front wheels chain locked to the front of the ramps, which at their rear ends are pivoted clear of the ground;

FIG. 5 is a sectional view taken along section line 5—5 of FIG. 2;

FIG. 6 is a sectional view taken along section line 6—6 of FIG. 2; and

FIG. 7 is an enlarged side elevation of a proposed surge brake assembly.

DESCRIPTION OF THE PREFERRED EMBODIMENTS

In FIG. 1, a towing vehicle 20 is shown as pulling tow dolly 26 by means of a ball socket connection 32 to a conventional bumper hitch 24. The front wheels 36 of towed vehicle 22 are supported upon a pair of wheel ramps 71–72 longitudinally pivoted in the rear of the tow dolly. The tow dolly includes a surge brake mechanism 34 operatively connected to the wheels 37 and a steering linkage mechanism 78 turning these two dolly wheels 37, relatively to turning of the towing vehicle.

The tow dolly is more particularly illustrated in FIGS. 2 and 3. Towing vehicle 20 rear bumper 142 supports a hitch bar 4 by means of compression elements 46 and 48, each element including a housing 112, a top bumper clasping element 116, and a bottom bumper clasping element 114, tightened about bumper 142 by means of threaded bolt and knob assembly 118. This assembly is particularly illustrated in FIG. 3.

As illustrated in FIG. 2, chassis 26 includes a pair of arms 30 converging forwardly to join a tongue 95 beneath a plate 52 and having at the forward extremity of tongue 95 a ball socket cup 32 adjustable by means of knob 120. At the diverging aft end of arms 30 there is supported a transverse channel 56. Extending rearwardly of channel 56 are a pair of housing elements 92 which support the individual wheel axles 90, as well as the transverse pivoting bar 68. A pair of identical wheel ramps 71 and 72 are pivoted upon bar 68 so that their front arcuate portion 74 is presented forwardly of the axles 90 and so that the ramp portion 72 is presented rearwardly of the entire chassis.

Interconnecting the front arcuate portions 74 is a rectangular bar 54. A pair of identical hydraulic compression elements 58 and 60 are pivoted at one end to the chassis gusset 76 and at their other ends are pivoted to bar 76 by lugs 66.

The towed vehicle 22 may be loaded upon the inclined ramp under its own power as illustrated in FIG. 3. In FIG. 4, the vehicle is shown after being loaded, the weight of the front wheels 36 compressing the hydraulic pistons 58 and 60 so that the arcuate portion 74 rests below the axles 90 of the dolly wheels 37.

The individual wheels 36 of towed vehicle 22 are locked into the arcuate portions 74 by means of conventional chains 108 secured at their rear ends by linking to the upstanding ramp flanges 75. As indicated in FIG. 4, the individual chains 108 extend over the tires 36 and at their forward position are joined to contact chains 62 and 64 which are secured to channel 56. A conventional chain tightener or tension element may be used to lock chains 108, securing wheels 36 in place. As a result, a portion of the weight of the towed vehicle is transferred to the towing vehicle 20 rear wheels, and the towed vehicle 22 shocks (not illustrated) absorb a good deal of motion, eliminating the necessity for providing shocks in the tow dolly.

The linked steering mechanism is particularly illustrated in FIGS. 2, 5, and 6 as including a steering bar 78 extending through aperture 110 in arms 30 and connected via pivot pin 98 at its forward end to link 94. Link 94 is pivoted as at 96 to the chassis tongue 95. Link 94 is pivoted at its other end 100 to adjustable threaded coupler piece 102 which may be secured to a ball socket or like stud extending through the end of hitch bar 40. At its rear end, steering rod 78 is connected to the front of toggle link 80 mounted upon bracket 82 secured to the pivot bar 68. Toggle link 80 at its aft end is connected to tie arm 84, transferring relative turning of the towing vehicle to the individual wheels 37, the turning positions being shown in phantom. As illustrated in FIG. 6, the individual tie rod 84 is connected to these wheels 37 via link 86 secured to the wheels 37 beneath axles 90.

As illustrated in FIG. 7, the surge brake assembly 34 may be of the type including a stationary element 137 secured to the trailer tongue 95 and a sliding housing 138. A shock absorber 124 may be pivoted at one end to stationary element 37 by link 126 and pivoted to the sliding member 138 at its other end. A brake-actuating assembly 120 may be supported upon the sliding housing 138 via a pair of rods 128 and include a central shaft and clevis member extending to link 126. As the towing vehicle decelerates, housing 138 is slided upon tongue 137, thus pivoting link 126 and causing the central shaft to distend and actuate the tow dolly braking mechanism. Also, of course, chassis lights (not illustrated) may be supported in the tongue assembly.

As will be apparent, the towed car 22 can be driven up ramp 72 which then pivots on round frame section 68. As the towed car wheels 36 pass over the pivot point, they roll into the wheel wells 74, and the ramp pivots slowly against the force of the shocks 58 and 60. Since wheels 37 are thus positioned forwardly of the tow dolly wheels 37, a portion of the weight of the towed car 22 is transferred to the back wheels of towing car 22, providing more stability during towing.

Towed car 22 is tied down by means of chains 108, designed similarly to a standard tire chain, and attached at their front to the channel 56 by tension elements connected to chains 62 and 64. This relatively rigid attachment permits the tow dolly and the towed car 22 to pass over bumps or in and out of driveways without putting the unit in a bind. By anchoring the towed vehicle wheels 36 to the tow dolly, the towed vehicle floats upon its own spring suspension, eliminating the necessity for tow dolly springs.

The front wheels 36 of the towed car are carried only 7 or 8 inches above the ground, giving good ground clearance with a low center of gravity. The tow dolly minimizes side drag or sway of the towing car and thus provides a safe, convenient, and inexpensive method of transporting cars or trucks.

Manifestly, the tow dolly ramp structure, surge brake, and steering mechanisms may be varied without departing from the spirit of the invention.

We claim:

1. A tow dolly for wheeled vehicles comprising:
   A. chassis converging as a tongue having a towing vehicle connector at its forward end and supporting an axle and wheels at its aft end;
   B. a pair of wheel ramps longitudinally pivoted adjacent said axle and inwardly of said wheels in said aft end, said wheel ramps having a concave fore portion adapted for receiving and confining the front wheels of a towed vehicle.
   C. a compression means interposed between the forward end of said ramps and said chassis;
   D. a linked steering mechanism supported in said chassis and interconnecting each dolly wheel and a portion of said towing vehicle, so as to turn said tow dolly wheels relatively to turning of said towing auto; and
   E. a surge brake assembly mounted upon said chassis and connected to said wheels, so as to break said dolly as the towing vehicle decelerates, including:
      i. a main housing;
      ii. a shock absorber pivotably connected via a link at one end to said main housing;
      iii. a sliding assembly slidably supported upon said housing and connected to said shock absorber at its other end; and
      iv. a brake actuator supported upon said sliding mechanism and operatively contacting said link of said shock absorber, so as to actuate said brake system as said sliding assembly slides upon deceleration of said towing vehicle.

2. A tow dolly for wheeled vehicles as in claim 1, further including:
   F. a pivot bar transversely supported in said chassis rearwardly of said axle and said wheel ramps being pivoted upon said pivot rod such that the confined wheels of the towed vehicle are secured forwardly of the axle, so as to transfer a portion of the towed vehicle weight from the dolly to the towing vehicle rear wheels.

3. A tow dolly for wheeled vehicles as in claim 2, further including:
   G. locking chains having an aft end secured to the aft portion of each said ramp, a mid portion extensible over the towed vehicle front wheels and front end secured by tension means to said chassis.

4. A tow dolly for wheeled vehicles as in claim 3, said wheel ramps being configured so as to support a curvate portion of the towed vehicle front wheels below the axle of said dolly.

5. A tow dolly for wheeled vehicles as in claim 4, said wheel ramps being interconnected at their front ends by a transverse bar.

6. A tow dolly for wheeled vehicles as in claim 5, said compression means for each said wheel ramp including a hydraulic piston assembly pivoted at its lower end to said chassis and pivoted at its upper end to said transverse bar interconnecting said wheel ramps.